US012793659B2

(12) United States Patent
Yang et al.

(10) Patent No.: US 12,793,659 B2
(45) Date of Patent: Nov. 10, 2026

(54) IMAGING PROCESSING METHOD AND IMAGE PROCESSING DEVICE HAVING A MAXIMUM DISPLAY LUMINANCE ADJUSTED BASED ON BRIGHTNESS OF A PORTION OF A SOURCE IMAGE

(71) Applicant: MEDIATEK INC., Hsinchu City (TW)

(72) Inventors: Kai-Min Yang, Hsinchu City (TW); Kui-Chang Tseng, Hsinchu City (TW); Tsu-Ming Liu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 176 days.

(21) Appl. No.: 18/711,995

(22) PCT Filed: Dec. 2, 2022

(86) PCT No.: PCT/CN2022/136188

§ 371 (c)(1),
(2) Date: May 21, 2024

(87) PCT Pub. No.: WO2023/098870

PCT Pub. Date: Jun. 8, 2023

(65) Prior Publication Data

US 2025/0022428 A1 Jan. 16, 2025

Related U.S. Application Data

(60) Provisional application No. 63/285,142, filed on Dec. 2, 2021.

(51) Int. Cl.

*G09G 3/34* (2006.01)
*G06T 5/94* (2024.01)
(Continued)

(52) U.S. Cl.

CPC ............ *G09G 3/3406* (2013.01); *G06T 5/94* (2024.01); *G09G 3/2018* (2013.01);
(Continued)

(58) Field of Classification Search

CPC .. G09G 3/3406; G09G 3/2018; G09G 3/3225; G09G 2320/0233;
(Continued)

(56) References Cited

U.S. PATENT DOCUMENTS 9,529,561 B2 12/2016 Lee
10,127,867 B2 11/2018 Zhang
(Continued)

FOREIGN PATENT DOCUMENTS

CN 104751824 A 7/2015
CN 105185327 A 12/2015
WO 2021131209 A1 7/2021

OTHER PUBLICATIONS

Chinese language office action dated Jun. 7, 2024, issued in application No. TW 111146304.
(Continued)

*Primary Examiner* — David D Davis
(74) *Attorney, Agent, or Firm* — McClure, Qualey & Rodack, LLP

(57) ABSTRACT

An image processing method is provided. The method includes the step of analyzing brightness information of a portion of a source image. The method further includes the step of calculating the luminance control value based on the brightness information of the portion of the source image.
(Continued)

400

The method further includes the step of adjusting the maximum display luminance of the display apparatus based on the luminance control value.

16 Claims, 12 Drawing Sheets

(51) Int. Cl.
*G09G 3/20* (2006.01)
*G09G 3/3225* (2016.01)

(52) U.S. Cl.
CPC .. *G09G 3/3225* (2013.01); *G06T 2207/20208* (2013.01); *G09G 2320/0233* (2013.01); *G09G 2320/064* (2013.01); *G09G 2320/066* (2013.01); *G09G 2320/0666* (2013.01); *G09G 2320/0686* (2013.01); *G09G 2320/0693* (2013.01); *G09G 2330/023* (2013.01); *G09G 2360/16* (2013.01)

(58) Field of Classification Search
CPC ....... G09G 2320/064; G09G 2320/066; G09G 2320/0666; G09G 2320/0686; G09G 2320/0693; G09G 2330/023; G09G 2360/16; G09G 3/3696; G09G 2320/0646; G06T 5/94; G06T 2207/20208
See application file for complete search history.

(56) References Cited

U.S. PATENT DOCUMENTS

| | | | | |
|---|---|---|---|---|
| 11,776,489 | B2 | 10/2023 | Maekawa | |
| 2004/0217918 | A1 * | 11/2004 | Ando | G06F 3/1446 345/1.1 |
| 2011/0001737 | A1 * | 1/2011 | Kerofsky | G09G 5/10 345/207 |
| 2012/0019167 | A1 | 1/2012 | Chen | |
| 2015/0243228 | A1 * | 8/2015 | Kimura | G09G 3/3611 345/590 |
| 2017/0293205 | A1 | 10/2017 | Iwata | |
| 2018/0082661 | A1 * | 3/2018 | Kang | G09G 3/20 |
| 2018/0226032 | A1 * | 8/2018 | Kim | G09G 3/3406 |
| 2019/0189725 | A1 | 6/2019 | Miura | |
| 2019/0266961 | A1 * | 8/2019 | Slavenburg | G09G 3/2096 |
| 2020/0013151 | A1 | 1/2020 | Atkins | |
| 2020/0029106 | A1 * | 1/2020 | Liu | H04N 21/234345 |
| 2020/0154083 | A1 | 5/2020 | Zhang | |

OTHER PUBLICATIONS

International Search Report and Written Opinion dated Jan. 28, 2023, issued in application No. PCT/CN2022/136188.

* cited by examiner

IMAGING PROCESSING METHOD AND IMAGE PROCESSING DEVICE HAVING A MAXIMUM DISPLAY LUMINANCE ADJUSTED BASED ON BRIGHTNESS OF A PORTION OF A SOURCE IMAGE

CROSS REFERENCE TO RELATED APPLICATIONS

This Application claims priority of U.S. Patent Application No. 63/285,142, filed on Dec. 2, 2021, the entirety of which is incorporated by reference herein.

TECHNICAL FIELD

The present disclosure relates in general to image processing, and it relates particularly to an image processing method and an image processing device with dynamic and adaptive luminance control.

BACKGROUND

Bit depth and luminance of a display apparatus are critical factors in high dynamic range (HDR) applications. Typically, a conventional or lower-end display apparatus offers luminance ranging from 100 nits to 500 nits, and 8-bit depth (i.e., 256 levels of luminance). For HDR display panels, the maximum luminance bump up to around 1000 nits or even more, and the bit depth increases to 10. Since the HDR images generated from an HDR application are designed to be displayed on an HDR display apparatus, the visual effects of the HDR images will be disappointing if they are displayed on a conventional or lower-end display apparatus.

FIG. 1 shows two exemplary color ramps (or color gradients) 10L and 10H produced by a display panel with 8-bit depth when displaying a normal image and an HDR image, respectively. As shown in FIG. 1, the color ramps 10L and 10H both have 256 levels of brightness, and the HDR image has a higher maximum brightness (and a broader range of brightness) compared to the normal image. Hence, the range of brightness allocated to each level of the color ramp 10H are relatively larger (though the allocation is not necessarily linear or uniform). This causes the boundary between adjacent levels of brightness becomes detectable, producing a sense of discontinuity in brightness changes of the HDR image.

Therefore, it would be desirable to have an image processing method and an image processing device with dynamic and adaptive luminance control.

BRIEF SUMMARY OF THE INVENTION

An image processing method is provided by an embodiment of the present disclosure. The method includes the step of analyzing brightness information of a portion of a source image. The method further includes the step of calculating the luminance control value based on the brightness information of the portion of the source image. The method further includes the step of adjusting the maximum display luminance of the display apparatus based on the luminance control value.

An image processing device is provided by an embodiment of the present disclosure. The image processing device includes a content analyzer module and a luminance control module. The content analyzer module is configured to analyze brightness information of a portion of a source image. The luminance control module is configured to calculate the luminance control value based on the brightness information of the portion of the source image, and to adjust the maximum display luminance of the display apparatus based on the luminance control value.

The embodiments of the image processing method and the image processing device can dynamically and adaptively control the maximum display luminance of the display apparatus based on the brightness of the image, enabling images (especially HDR images) to be displayed more properly on a wide variety of display apparatus.

BRIEF DESCRIPTION OF THE DRAWINGS

The present disclosure can be better understood by reading the subsequent detailed description and examples with references made to the accompanying drawings. Additionally, it should be appreciated that in the flow diagram of the present disclosure, the order of execution for each blocks can be changed, and/or some of the blocks can be changed, eliminated, or combined.

DETAILED DESCRIPTION OF THE INVENTION

The following description provides embodiments of the invention, which are intended to describe the basic spirit of the invention, but is not intended to limit the invention. For the actual inventive content, reference must be made to the scope of the claims.

In each of the following embodiments, the same reference numbers represent identical or similar elements or components.

It must be understood that the terms "including" and "comprising" are used in the specification to indicate the existence of specific technical features, numerical values, method steps, process operations, elements and/or components, but do not exclude additional technical features, numerical values, method steps, process operations, elements, components, or any combination of the above.

Ordinal terms used in the claims, such as "first," "second," "third," etc., are only for convenience of explanation, and do not imply any precedence relation between one another.

The description for the embodiments the image processing method is also applicable to the embodiments of the image processing device, and vice versa.

Figure 1:
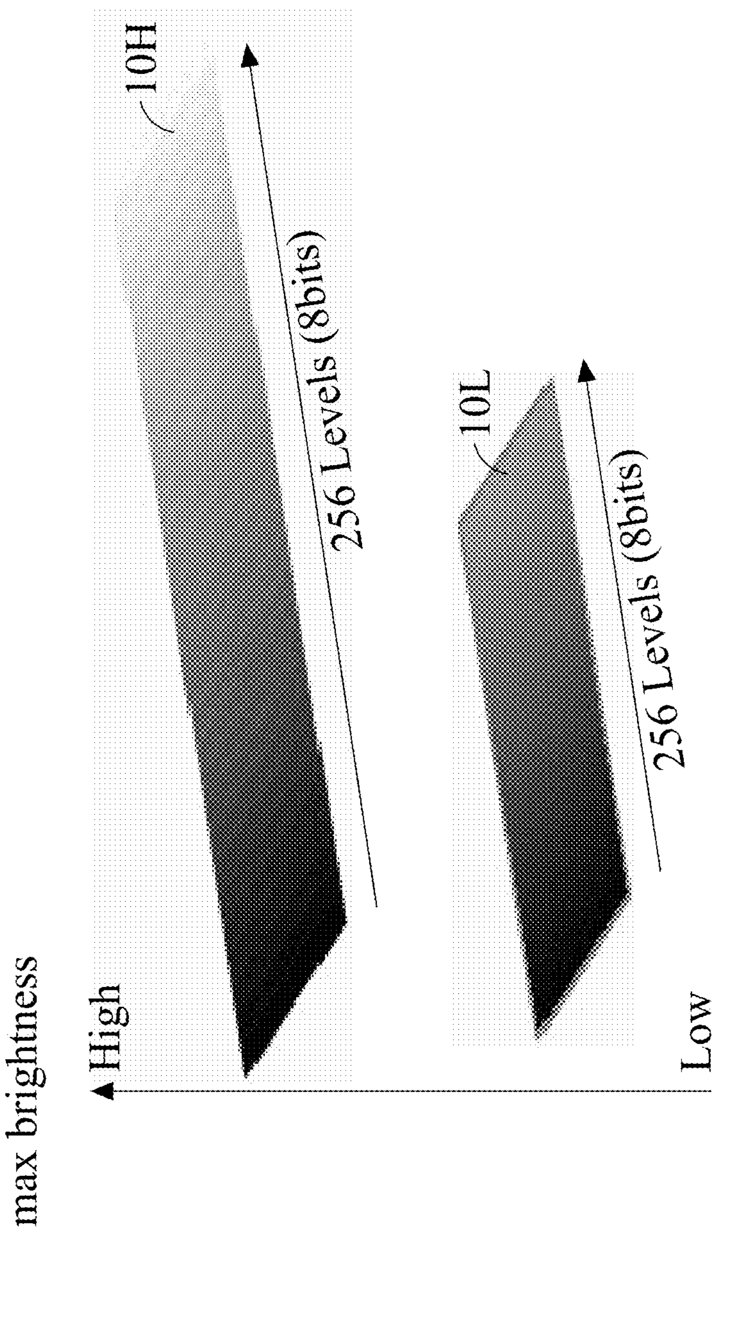
FIG. 1 shows two exemplary color ramps produced by a display panel with 8-bit depth when displaying a normal image and an HDR image, respectively.
Figure 2A:
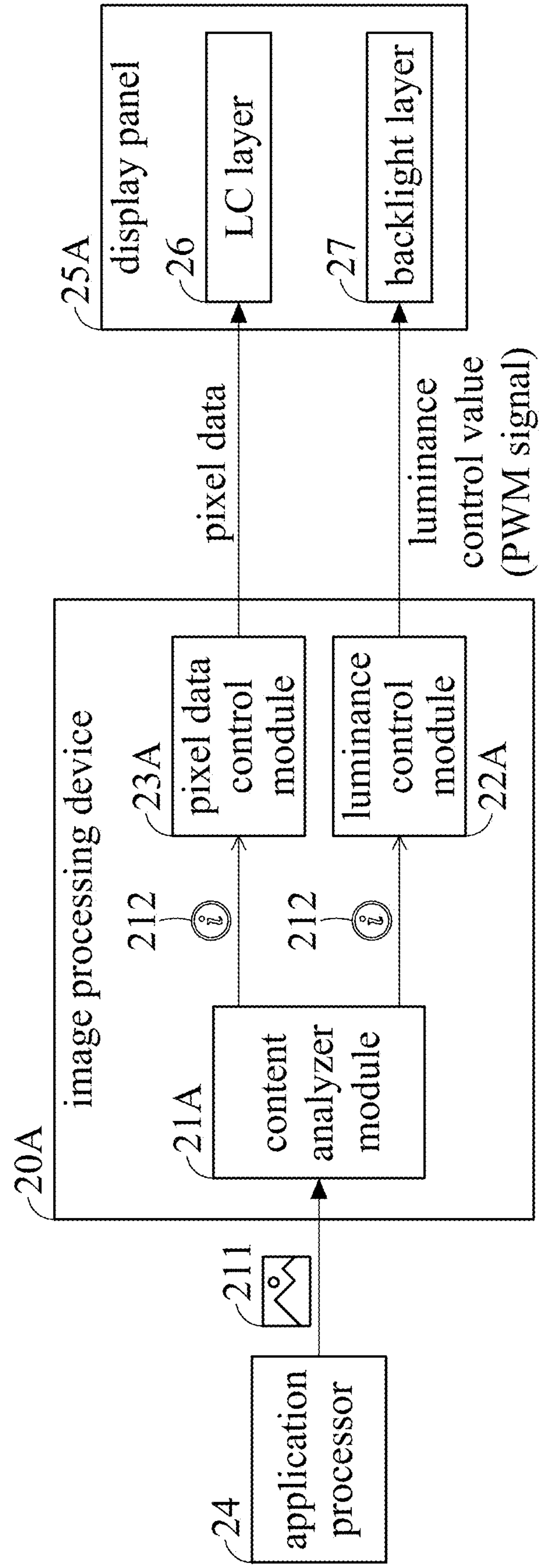
FIG. 2A illustrates the architecture of an image processing device, according to some embodiments of the present disclosure.

FIG. 2A illustrates the architecture of the image processing device 20A, according to some embodiments of the present disclosure. As shown in FIG. 2A, the image processing device 20A may include a content analyzer module 21A, a luminance control module 22A, and a pixel data control module 23A. In these embodiments, the processed image is to be displayed on a liquid-crystal display (LCD) apparatus (not shown in FIG. 2A), which includes a display panel 25A. The display panel 25A may further include a liquid crystal (LC) layer 26 and a backlight layer 27.

In an embodiment, the image processing device 20A can be a general-purpose microprocessor or a microcontroller loading a program or an instruction set to carry out the features of the content analyzer module 21A, the luminance control module 22A, and the pixel data control module 23A. In another embodiment, the image processing device 20A can be an application-specific integrated circuit (ASIC) such as a display driver integrated circuit (DDIC). The content analyzer module 21A, the luminance control module 22A, and the pixel data control module 23A within the image processing device 20A can be specifically designed electrical circuits, the features of which will be described later.

In an embodiment, the image processing device 20 receives source image data from the application processor 24. The source image data is the data associated with the source image 211 generated by the application processor 24 when running an application program. The application processor can be a general-purpose processor running the application program in a computer system, such as a central processing unit (CPU) or a graphic processing unit (GPU). The computer system can be a personal computer (e.g., desktop computer or laptop computer), a server computer, or a mobile computing device (e.g., mobile phone or tablet computer) running an operating system (e.g., Windows, Mac OS, Linux, UNIX, etc.). The application program can be any software program providing images to viewers, such as games, video/multimedia player programs, web browsers, photo viewing programs, etc., the present disclosure is not limited thereto.

In an embodiment, the content analyzer module 21 is configured to analyze brightness information 212 of a portion of the source image 211 based on the received source image data associated with the source image 211. Then, the brightness information 212 is transmitted to the luminance control module 22A and the pixel data control module 23A.

In an embodiment, the brightness information 212 may include an average pixel value, a maximum pixel value, a medium pixel value, a distribution of pixel brightness, a cumulative distribution function of pixel brightness, a probability density function of pixel brightness, and/or a pixel count ratio between brightness areas. The distribution of pixel brightness can be mathematically expressed by a probability density function (PDF), and can be drawn in the form of a pixel brightness histogram (also called "image histogram"), which will be described later.

In an embodiment, the luminance control module 22A is configured to calculate the luminance control value based on the brightness information 212 of the portion of the source image 211, and to adjust the maximum display luminance of the display apparatus based on the luminance control value.

In an embodiment, the luminance control module 22A adjusts the maximum display luminance of the display apparatus by generating a pulse-width modulation (PWM) signal based on the luminance control value, and transmitting the PWM signal to the backlight layer 27 of the display panel 25A of the display apparatus. In other words, the luminance control value for controlling the maximum display luminance of the display apparatus is transmitted to the backlight layer 27 of the display panel 25A is the form of the PWM signal.

In an embodiment, the pixel data control module 23A is configured to adjust pixel data of the portion of the source image 211 based on the brightness information 212. The pixel data may include the pixel value of each of a plurality of pixels of the portion of the source image 211. The pixel data is transmitted to the LC layer 26 of the display panel 25A of the display apparatus.

Based on the embodiments described above, the backlight layer 27 of the display panel 25A can provide the maximum display luminance based on the luminance control value which is adaptive to the brightness of the source image 211, while the LC layer 26 of the display panel 25A display each pixels of the source image 211 based on the pixel data which are also adaptive to the brightness of the source image 211. However, in an exceptional embodiment, the luminance control module 22A is further configured to lower the maximum display luminance of the display apparatus regardless of the brightness information in response to the display apparatus being in a power saving mode.

Figure 2B:
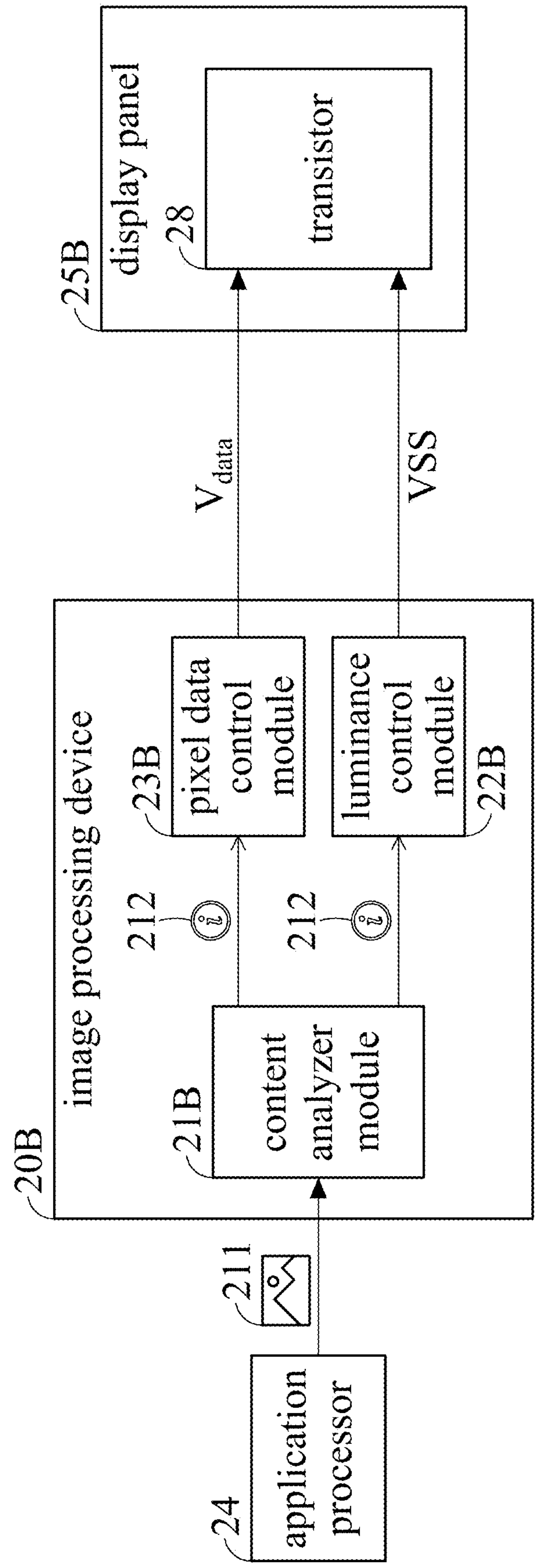
FIG. 2B illustrates the architecture of an image processing device, according to other embodiments of the present disclosure.

FIG. 2B illustrates the architecture of the image processing device 20B, according to other embodiments of the present disclosure. As shown in FIG. 2B, the image processing device 20B may include a content analyzer module 21B, a luminance control module 22B, and a pixel data control module 23B. In these embodiments, the processed image is to be displayed on an organic electroluminescence display (OLED) apparatus (not shown in FIG. 2B), which includes a display panel 25B. The display panel 25B may further include a transistor 28.

Besides the elements of the display panel, other differences between FIG. 2A and FIG. 2B are described in this paragraph. First, the luminance control module 22B adopts Gamma correction techniques to control the maximum display luminance of the OLED apparatus, while the luminance control module 22A in FIG. 2A adopts PWM techniques to control the maximum display luminance of the LCD apparatus. Furthermore, the luminance control value and the pixel data are transmitted to the display panel 25B in the form of a first voltage (referred to as "VSS" herein) and a second voltage (referred to as "$V_{data}$" herein), respectively. Specifically, the luminance control module 22B is configured to determine the first voltage VSS based on the luminance control value, and to apply the first voltage VSS to the transistor 28 in a display panel 25B. The pixel data control module 23B is configured to determine the second voltage $V_{data}$ based on the adjusted pixel value, and to apply the second voltage $V_{data}$ to the transistor 28 in the display panel 25B.

Except the description of the previous paragraph, the operating principles or features of the image processing device 20B, the content analyzer module 21B, the luminance control module 22B, and the pixel data control module 23B in FIG. 2B are respectively similar to the image processing device 20A, the content analyzer module 21A, the luminance control module 22A, and the pixel data control module 23A in FIG. 2A, so the description thereof are not repeated.

Figure 3:
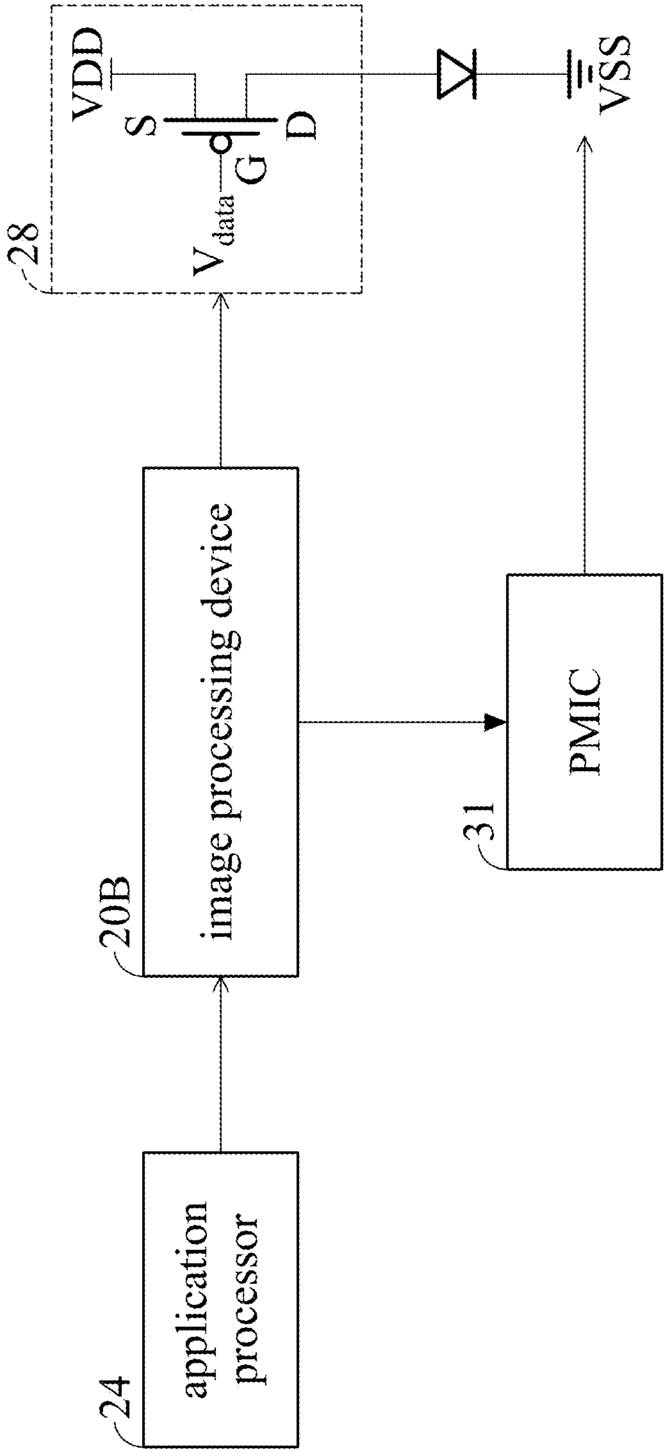
FIG. 3 illustrates the luminance control of the image processing device, according to an embodiment of the present disclosure.

FIG. 3 illustrates the luminance control of the image processing device 20B, according to an embodiment of the present disclosure. In this embodiment, the image processing device 20B applies the first voltage VSS to the drain electrode (denoted by "D" in FIG. 3) of the transistor 28 through a power management integrated circuit (PMIC) 31, and applies the second voltage $V_{data}$ to the gate electrode (denoted by "G" in FIG. 3) of the transistor 28. Furthermore, a constant third voltage (referred to as "VDD" herein) is applied to the source gate (denoted by "S" in FIG. 3) of the transistor 28.

In this embodiment, the constant third voltage VDD is higher than the variable first voltage VSS, and the maximum display luminance of the OLED apparatus is dependent on the difference between the first voltage VSS and the third voltage VDD. Specifically, as the first voltage VSS increases, the difference between the first voltage VSS and the third voltage VDD will decrease, causing the current passing through the transistor 28 to decrease as well, and thus the maximum display luminance of the OLED apparatus will decrease. On the contrary, as the first voltage VSS decreases, the difference between the first voltage VSS and the third voltage VDD will increase, causing the current passing through the transistor 28 to increase as well, and thus the maximum display luminance of the OLED apparatus will increase.

Figure 4:
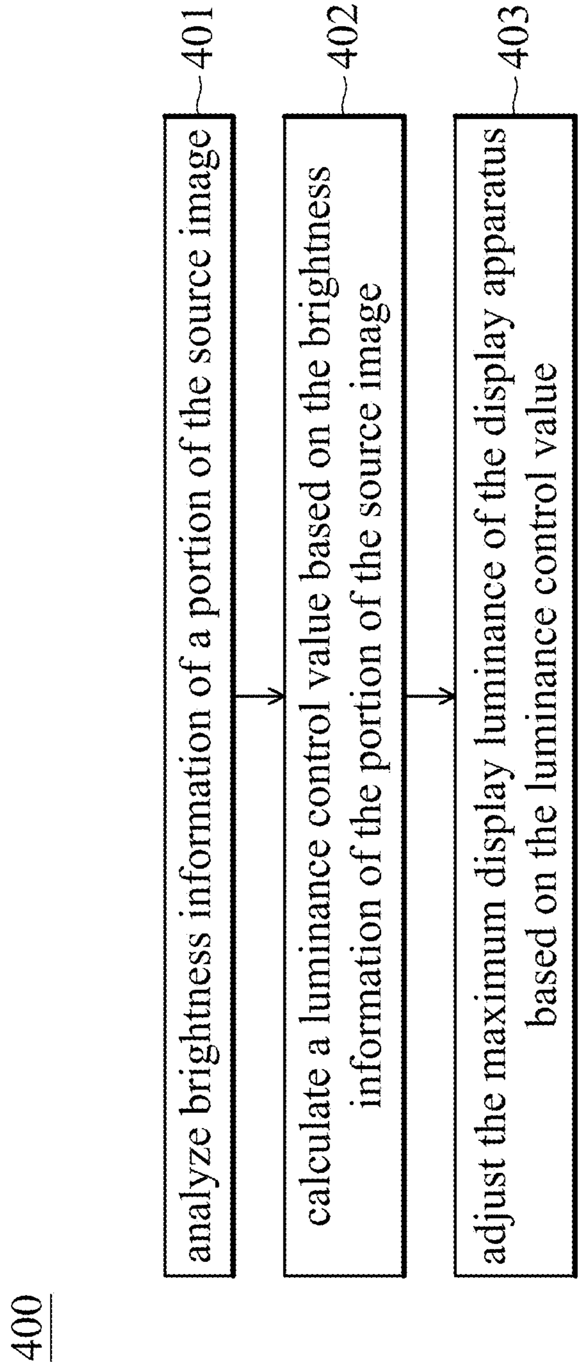
FIG. 4 is the flow diagram illustrating an image processing method, according to an embodiment of the present disclosure.

FIG. 4 is the flow diagram illustrating the image processing method 400, according to an embodiment of the present disclosure. As shown in FIG. 4, the method 400 may include steps 401-403. The steps 401-403 can be respectively carried out by the content analyzer module 21A, the luminance control module 22A, and the pixel data control module 23A of the image processing device 20A in FIG. 2A, or they can be respectively carried out by the content analyzer module 21B, the luminance control module 22B, and the pixel data control module 23B of the image processing device 20B in FIG. 2B.

In step 401, brightness information (e.g., the brightness information 212 illustrated in FIGS. 2A and 2B) of a portion of the source image (e.g., the source image 211 illustrated in FIGS. 2A and 2B) is analyzed. As previously described, the brightness information may include an average pixel value, a maximum pixel value, a medium pixel value, a distribution of pixel brightness, a cumulative distribution function of pixel brightness, a probability density function of pixel brightness, and/or a pixel count ratio between brightness areas. Then, the method 400 proceeds to step 402.

In step 402, a luminance control value is calculated based on the brightness information of the portion of the source image. Then, the method 400 proceeds to step 403.

In step 403, the maximum display luminance of the display apparatus is adjusted based on the luminance control value calculated in step 402.

Figure 5:
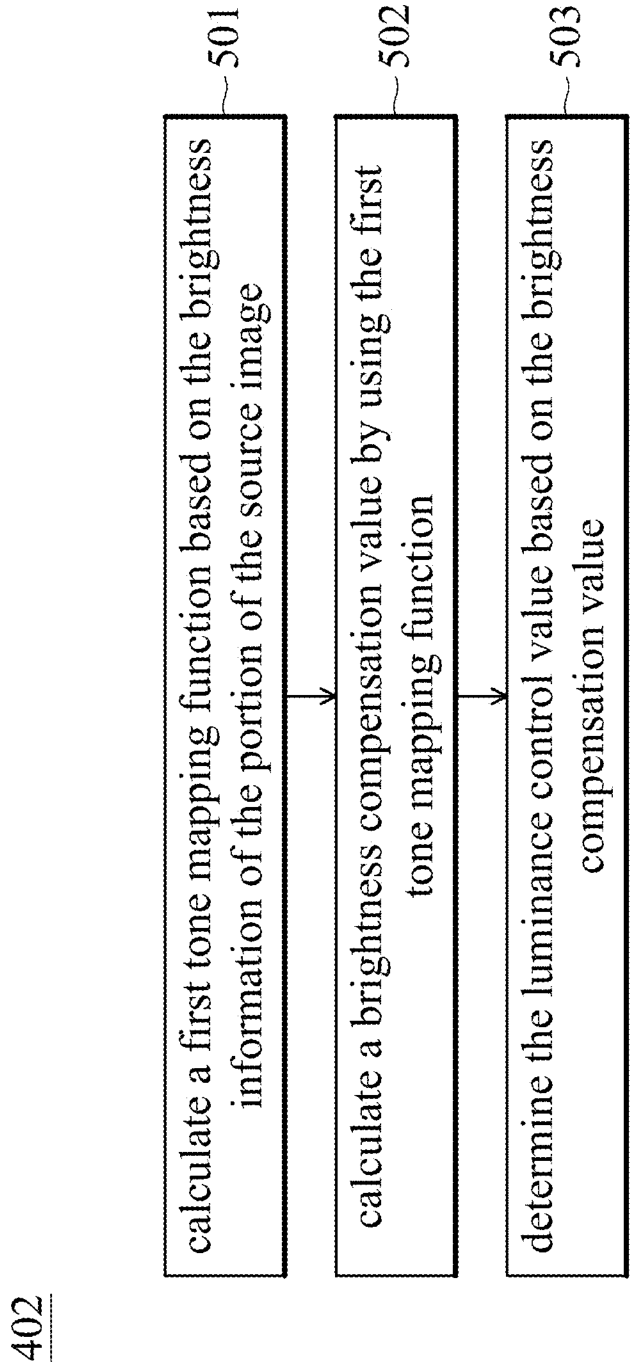
FIG. 5 is the flow diagram illustrating the process of the calculation of the luminance control value, according to an embodiment of the present disclosure.

FIG. 5 is the flow diagram illustrating the process of step 402 in FIG. 4, according to an embodiment of the present disclosure. As shown in FIG. 5, step 402 may further include steps 501-503.

In step 501, a first tone mapping function is calculated based on the brightness information (e.g., the brightness information 212 illustrated in FIGS. 2A and 2B) of the portion of the source image (e.g., the source image 211 illustrated in FIGS. 2A and 2B). The first tone mapping function defines the correlation between the input brightness (or the input pixel value) of a pixel of the source image and the output brightness (which can be regarded as "fine-tune brightness") by mapping the input brightness to the output brightness.

In step 502, a brightness compensation value is calculated by using the first tone mapping function. The brightness compensation value indicates the value of brightness that should be compensated when the brightness information of the portion of the source image changes. In an embodiment, the brightness compensation value is the difference between a default constant value and the function value (i.e., output brightness or output pixel data) of the first tone mapping function. The default constant value can be the default peak brightness value. In another embodiment, the brightness compensation value can be the difference between the function values (i.e., output brightness or output pixel data) of the first tone mapping function and the function value of the reference tone mapping function, given a specific input brightness or input pixel data (e.g., the peak brightness of the portion of the source image). The reference tone mapping function can be a default tone mapping function that is adopted by the image processing device to fine-tune the color or brightness of each pixels of the source image. Compared to the reference tone mapping function, the first tone mapping function further takes the overall brightness information of the portion of the source image into consideration.

In step 503, the luminance control value is determined based on the brightness compensation value. In an embodiment, the luminance control value is determined by using a conversion function that takes the brightness compensation value as input and outputs the luminance control value. In another embodiment, the luminance control value is determined by looking up a calibration table that records the correspondence (or mapping relationship) between the luminance control value and the brightness compensation value calculated in step 502.

The first tone mapping function and the reference tone mapping function can be drawn in the form of tone mapping curves. The tone mapping curves are typically non-linear, but the present disclosure is not limited thereto. The pixel brightness histogram, the tone mapping curves, the brightness compensation value, and their relationship when overall brightness of the portion of the source image decreases will be described in more details with reference to FIG. 6A and the corresponding FIG. 6B. It should be appreciated that these figures are only for the convenience of explaining the concept of the pixel brightness histogram, the distribution of pixel brightness, and the tone mapping functions/curves.

Drawing the diagram of pixel brightness histogram or the tone mapping curves is not a necessary step included in the image processing method of the present disclosure.

Figure 6B:
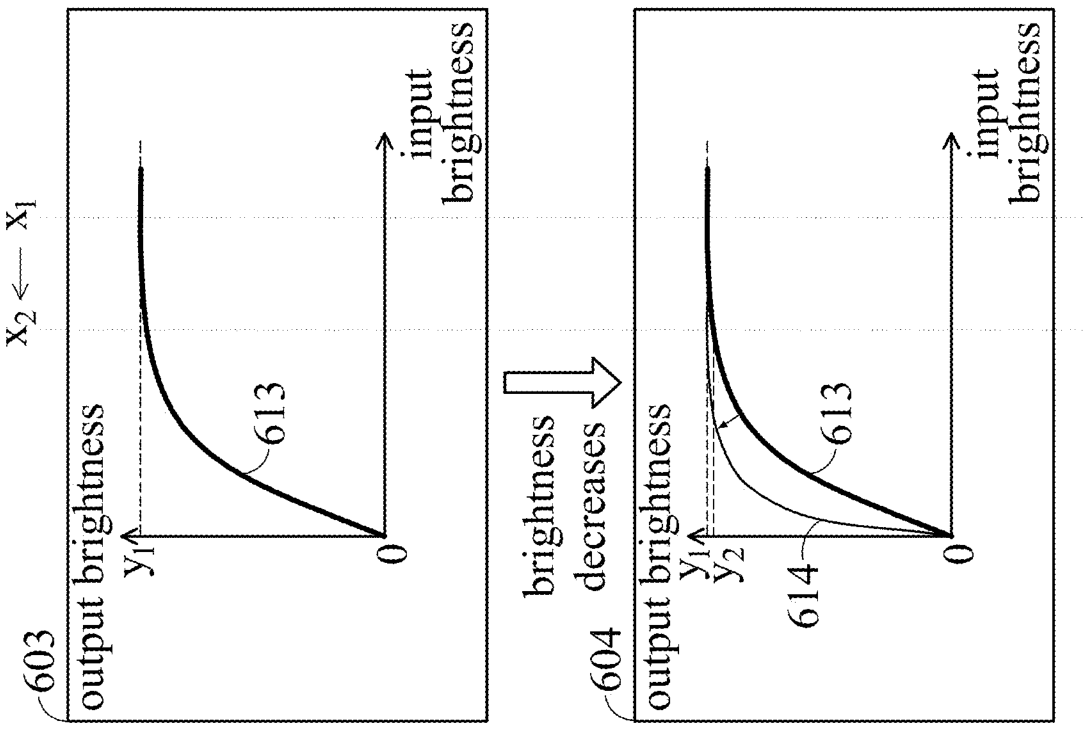
FIG. 6B shows the exemplary diagrams for illustrating the comparison between two tone mapping curves, according to an embodiment of the present disclosure.
Figure 6A:
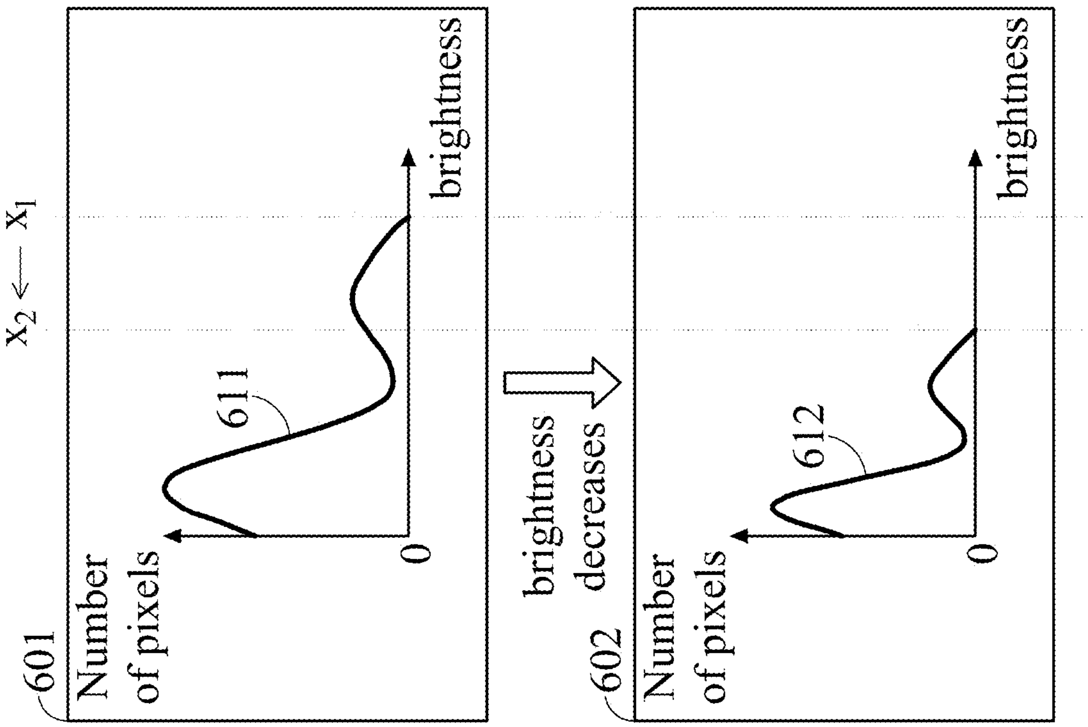
FIG. 6A shows the exemplary pixel brightness histograms before and after the overall brightness of the portion of the source image decreases.

FIG. 6A shows the exemplary pixel brightness histograms 601 and 602 respectively before and after the overall brightness of the portion of the source image decreases. As shown in FIG. 6A, the pixel brightness histograms 601 and 602 illustrates the distribution of pixel brightness 611 and the distribution of pixel brightness 612, respectively. The x-axis and the y-axis of both the pixel brightness histograms 601 and 602 denote the brightness (or pixel value) and the number of pixels, respectively. In this example, compared to the distribution of pixel brightness 611, the distribution of pixel brightness 612 is squeezed toward the lower brightness areas (i.e., the left side), representing that the overall brightness of the portion of the source image decreases. As the overall brightness of the portion of the source image decreases, the peak brightness $x_1$ in the distribution of pixel brightness 611 shifts toward the left to the peak brightness $x_2$ in the distribution of pixel brightness 612.

FIG. 6B, which corresponds to FIG. 6A, shows the exemplary diagrams 603 and 604 for illustrating the comparison between the tone mapping curves 613 and 614, according to an embodiment of the present disclosure. The tone mapping curves 613 and 614 are drawn based on the reference tone mapping function and the first tone mapping function, respectively. As shown in FIG. 6B, the x-axis and the y-axis of both the diagrams 603 and 604 denote the input brightness (or input pixel value) and the output brightness (or output pixel value), respectively. It can be seen in the diagram 603 that the vertical line $X=x_1$ intersects the tone mapping curve 613 at $(x_1, y_1)$, where $x_1$ is the peak brightness in the distribution of pixel brightness 611 before the overall brightness of the portion of the source image decreases. It means that the reference tone mapping function maps the input peak brightness $x_1$ to the output brightness $y_1$. On the other hand, it can be seen in the diagram 604 that the vertical line $X=x_2$ respectively intersects the tone mapping curves 613 and 614 at $(x_2, y_1)$ and $(x_2, y_2)$, where $x_2$ is the peak brightness in the distribution of pixel brightness 612 after the overall brightness of the portion of the source image decreases. It means that the reference tone mapping function and the first tone mapping function map the input peak brightness $x_2$ to the output brightness $y_2$ and $y_1$, respectively. Thus, the brightness compensation value can be obtained by calculating the difference between the output brightness $y_2$ and $y_1$.

Figure 7A:
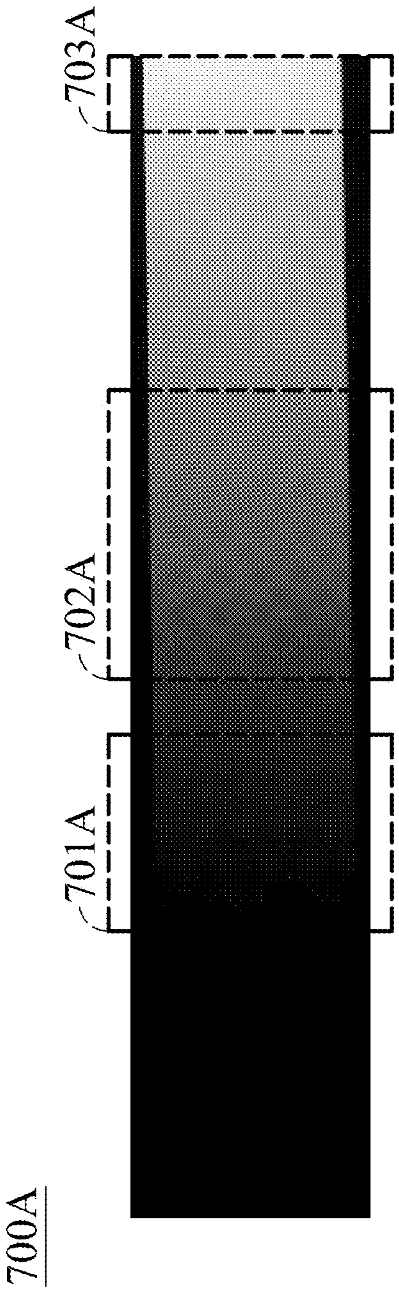
FIG. 7A shows the exemplary color ramp displayed on the display apparatus when the overall brightness of the portion of the source image is lower and the image processing method of the present disclosure is not adopted.
Figure 7B:
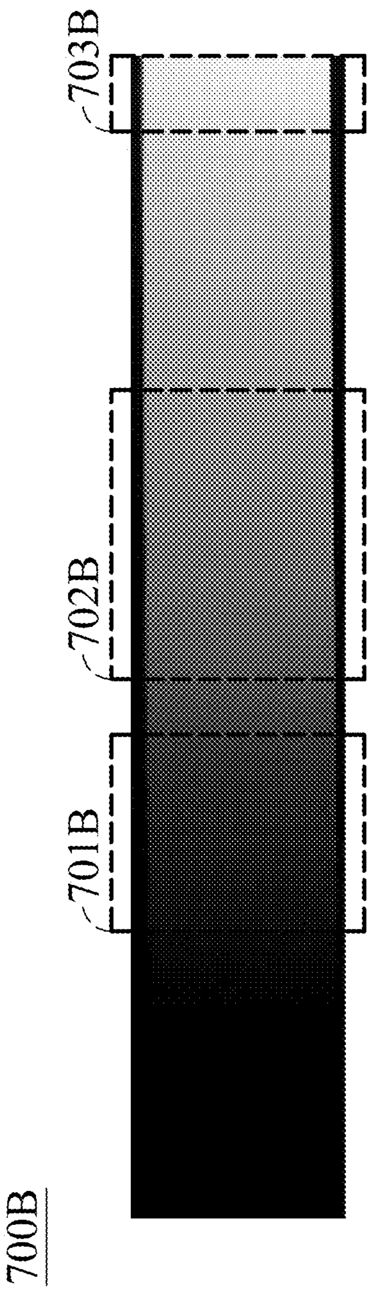
FIG. 7B shows the exemplary color ramp displayed on the display apparatus when the overall brightness of the portion of the source image is lower and the image processing method of the present disclosure is adopted.

FIG. 7A shows the exemplary color ramp 700A displayed on the display apparatus when the overall brightness of the portion of the source image is lower (as shown by the pixel brightness histogram 602 in FIG. 6A) and the image processing method of the present disclosure is not adopted. FIG. 7B, which corresponds to FIG. 7A, shows the exemplary color ramp 700B displayed on the display apparatus when the overall brightness of the portion of the source image is lower (as shown by the distribution of pixel brightness 612 in FIG. 6A) and the image processing method of the present disclosure is adopted.

By observing and comparing FIG. 7A and FIG. 7B, the following three points can be found: (i) the details of the brightness changes is more delicate in the low-brightness area 701B of the color ramp 700B than in the low-brightness area 701A of the color ramp 700A; (ii) the boundary between adjacent levels of brightness is detectable in the mid-brightness area 702A of the color ramp 700A, while the mid-brightness area 702B of the color ramp 700B looks more continuous and natural; and (iii) the max-brightness area 703A of the color ramp 700A and the max-brightness area 703B of the color ramp 700B looks substantially identical. In view of these points, it can be concluded that the image processing method of the present disclosure can improve the display quality of the images with lower brightness. Specifically, the details of the brightness changes in the low-brightness area is enhanced, the sense of discontinuity in brightness changes in the mid-brightness area is smoothed away, while the max-brightness area, which has no problem at all, can be maintained.

The pixel brightness histogram, the tone mapping curves, the brightness compensation value, and their relationship when overall brightness of the portion of the source image increases will be described in more details with reference to FIG. 8A and the corresponding FIG. 8B.

Figure 8B:
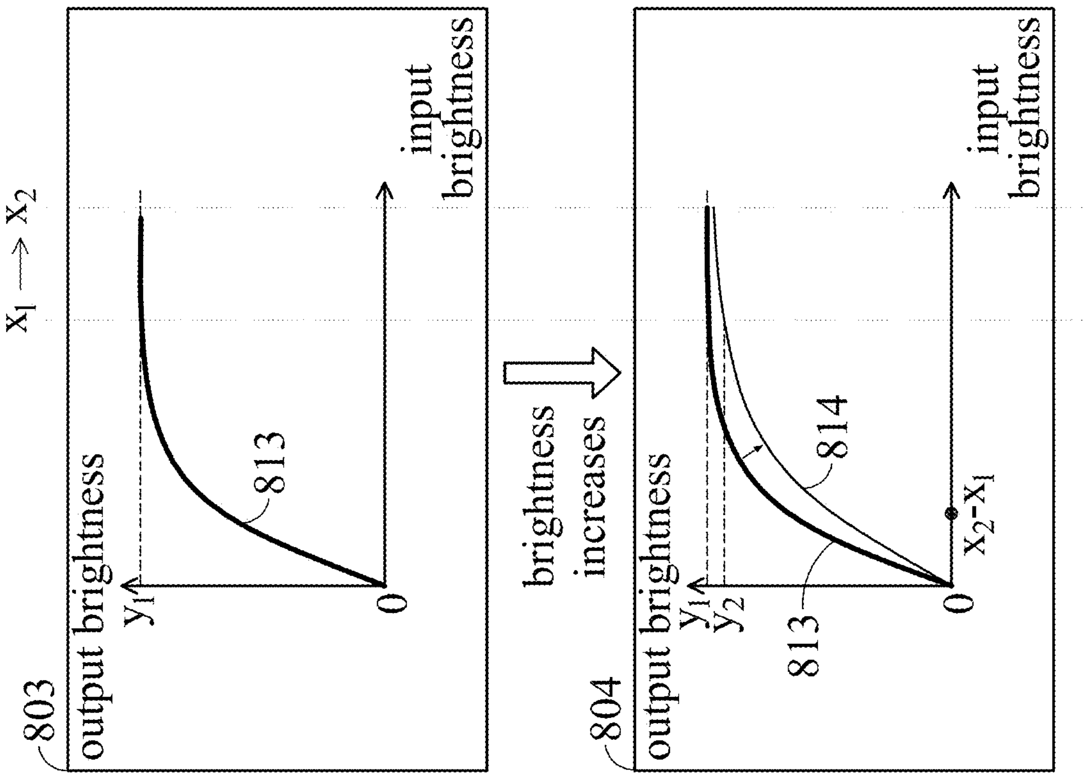
FIG. 8B shows the exemplary diagrams for illustrating the comparison between two tone mapping curves, according to an embodiment of the present disclosure.
Figure 8A:
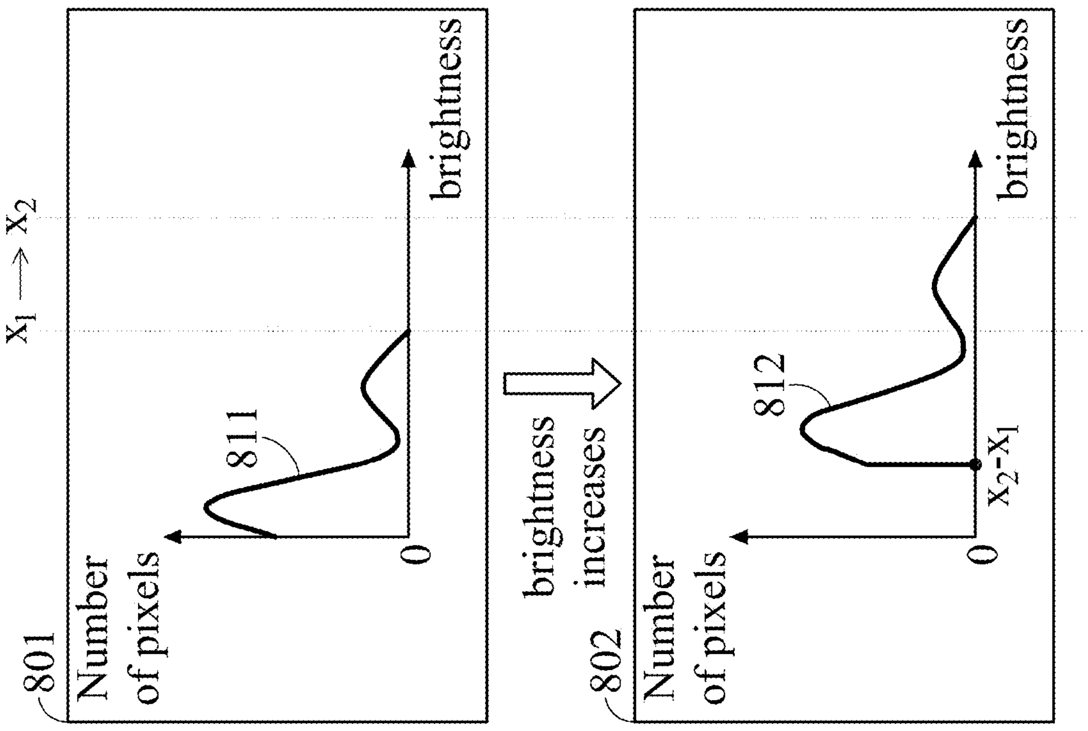
FIG. 8A shows the exemplary pixel brightness histograms before and after the overall brightness of the portion of the source image increases.

FIG. 8A shows the exemplary pixel brightness histograms 801 and 802 respectively before and after the overall brightness of the portion of the source image increases. As shown in FIG. 8A, the pixel brightness histograms 801 and 802 illustrates the distribution of pixel brightness 811 and the distribution of pixel brightness 812, respectively. The x-axis and the y-axis of both the pixel brightness histograms 801 and 802 denote the brightness (or pixel value) and the number of pixels, respectively. In this example, compared to the distribution of pixel brightness 811, the distribution of pixel brightness 812 shifts toward the right (i.e., higher brightness areas), representing that the overall brightness of the portion of the source image increases. As the overall brightness of the portion of the source image increases, the peak brightness $x_1$ in the distribution of pixel brightness 811 shifts toward the right to the peak brightness $x_2$ in the distribution of pixel brightness 812.

FIG. 8B, which corresponds to FIG. 8A, shows the exemplary diagrams 803 and 804 for illustrating the comparison between the tone mapping curves 813 and 814, according to an embodiment of the present disclosure. The tone mapping curves 813 and 814 are drawn based on the reference tone mapping function and the first tone mapping function, respectively. As shown in FIG. 8B, the x-axis and the y-axis of both the diagrams 803 and 804 denote the input brightness (or input pixel value) and the output brightness (or output pixel value), respectively. It can be seen in the diagram 803 that the vertical line $X=x_1$ intersects the tone mapping curve 813 at $(x_1, y_1)$, where $x_1$ is the peak brightness in the distribution of pixel brightness 811 before the overall brightness of the portion of the source image increases. It means that the reference tone mapping function maps the input peak brightness $x_1$ to the output brightness $y_1$. On the other hand, it can be seen in the diagram 804 that the vertical line $X=x_1$ respectively intersects the tone mapping curves 813 and 814 at $(x_1, y_1)$ and $(x_1, y_2)$. It means that the reference tone mapping function and the first tone mapping function map the input peak brightness $x_1$ to the output brightness $y_2$ and $y_1$, respectively. Thus, the brightness compensation value can be obtained by calculating the difference between the output brightness $y_2$ and $y_1$.

Figure 9:
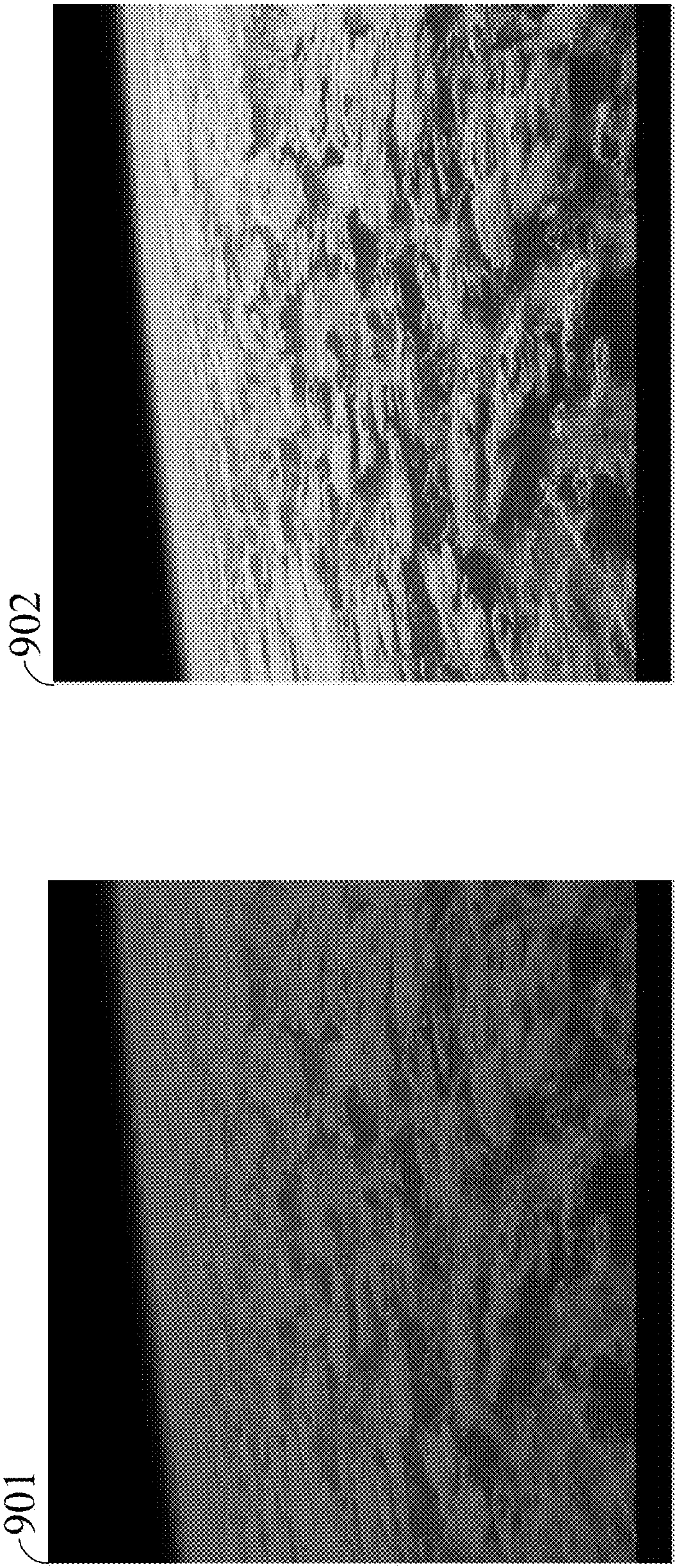
FIG. 9 shows the different display qualities of the same exemplary image with and without the method of the present disclosure being adopted when the overall brightness of the portion of the source image is higher.

FIG. 9 shows the different display qualities of the same exemplary image with and without the method of the present disclosure being adopted when the overall brightness of the portion of the source image is higher (as shown by the pixel brightness histogram 802 in FIG. 8A). The pictures 901 and 902 in FIG. 9 represents the display quality of the exemplary image with and without the method of the present disclosure being adopted, respectively. As it can be seen in FIG. 9, the contrast effect of the picture 902 is better than the contrasts effect of the picture 901. In view of this, it can be concluded that the image processing method of the present disclosure can enhance the contrast effect of the images when the overall brightness of the portion of the source image is higher.

Figure 10:
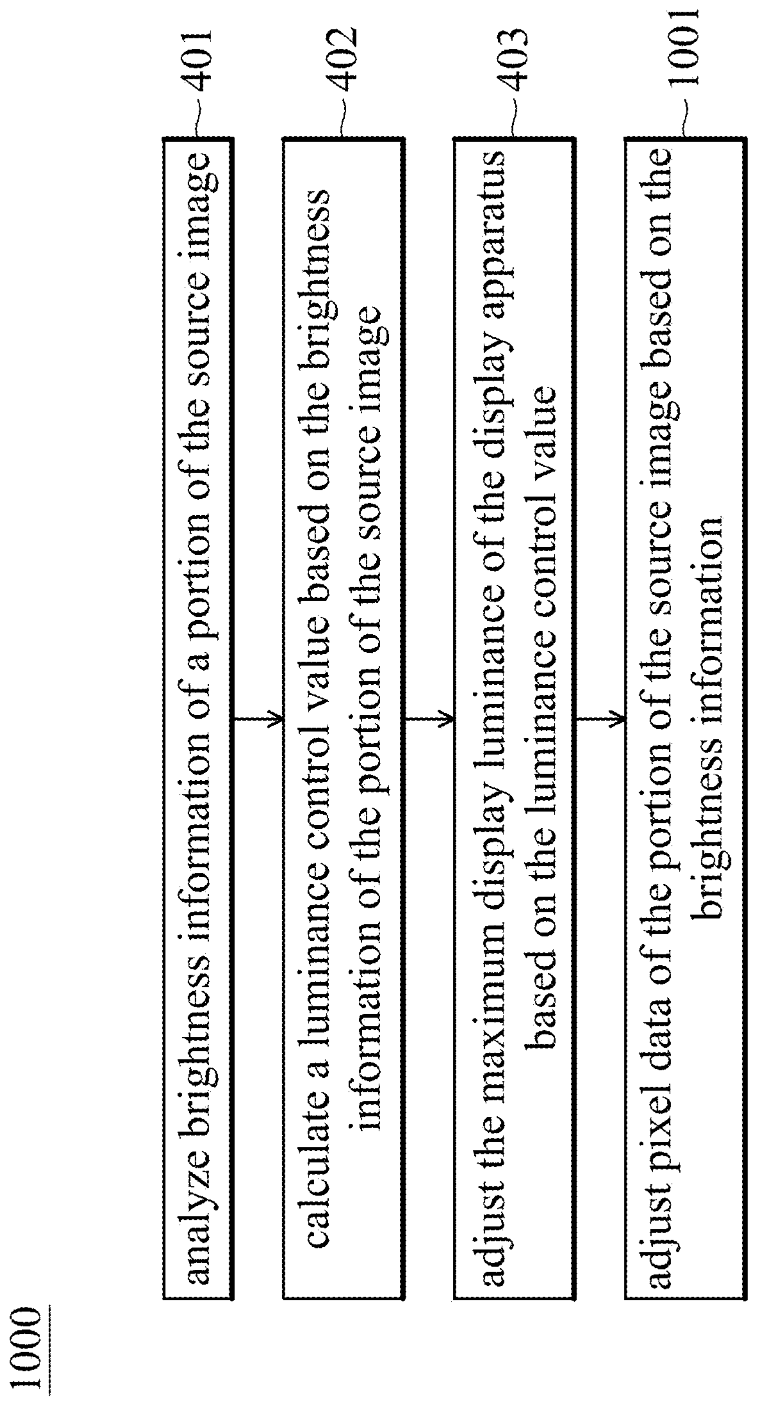
FIG. 10 is the flow diagram illustrating an image processing method, according to an embodiment of the present disclosure.

FIG. 10 is the flow diagram illustrating the image processing method 1000, according to an embodiment of the present disclosure. Compared to the method 400 of FIG. 4, the method 1000 of FIG. 10 further includes the step 1001, where the pixel data of the portion of the source image (e.g., the source image 211 illustrated in FIGS. 2A and 2B) is adjusted based on the brightness information (e.g., the brightness information 212 illustrated in FIGS. 2A and 2B). Although the step 1001 is drawn after the step 403 in FIG. 10, the order of execution of the steps 403 and 1001 is not limited by the present disclosure. In other words, the order of execution of the steps 403 and 1001 is interchangeable, or the steps 403 and 1001 can be executed simultaneously in the embodiments of the present disclosure.

In an embodiment, the pixel data of the portion of the source image is adjusted by using one of the following strategies: (i) the first strategy, where a tone mapping function, such as the first tone mapping function described above or its variation, is used to calculate the adjusted pixel value; (ii) the second strategy, where a one-dimensional lookup table (1DLUT) is used to determine the adjusted pixel value; (iii) the third strategy, where a three-dimensional lookup table (3DLUT) is used to determine the adjusted pixel value; and (iv) the fourth strategy, where an N×M transformation matrix is applied to the input pixel data to determine the adjusted pixel value, wherein the values of N and M are arbitrary.

In an embodiment, the colors of the pixel value can be mapped in an HSV domain, a YCbCr domain, a YUV domain, an ICtCp domain, or in an RGB domain of color space. For example, a gain value for the pixel values can be determined by the Y-dimension value in the YUV domain of the portion of the source image. The tone mapping function in this example can be mathematically expressed by $P' = P \times Gain(Y)$, where P denotes the pixel value, Gain( ) denotes the gain value, and Y denotes the Y-dimension value in the YUV domain of the portion of the source image. For another example, the gain value for the pixel values can be determined by the maximum of the pixel values of R-dimension, G dimension, and B-dimension in the RGB domain. The tone mapping function in this example can be mathematically expressed by $P' = P \times Gain(Max(R, G, B))$, where P denotes the pixel value of R-dimension, G dimension, or B-dimension, Gain( ) denotes the gain value, and R, G, B denote the pixel value of R-dimension, G dimension, and B-dimension in the RGB domain, respectively.

In the other embodiment, the colors of the pixel value is transformed by an N×M transformation matrix to derive the adjusted pixel values. Typically, the values of N and M are arbitrary. By applying the N×M matrix on the input R, B and G data, the adjusted pixel values are obtained.

The pixel values in different color dimensions can be mapped using the same tone mapping function or using different tone mapping functions, the present disclosure is not limited thereto.

Figure 11A:
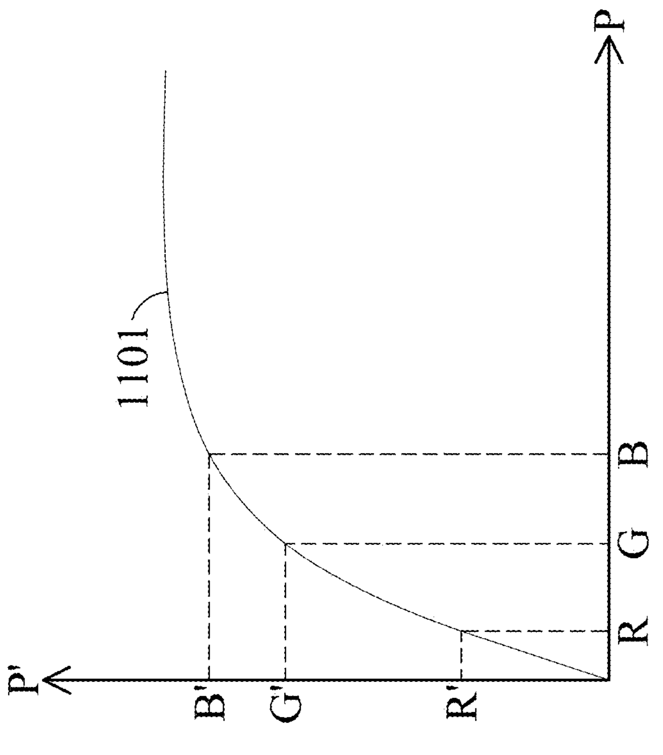
FIG. 11A plots a tone mapping curve, according to an embodiment of the present disclosure.
Figure 11B:
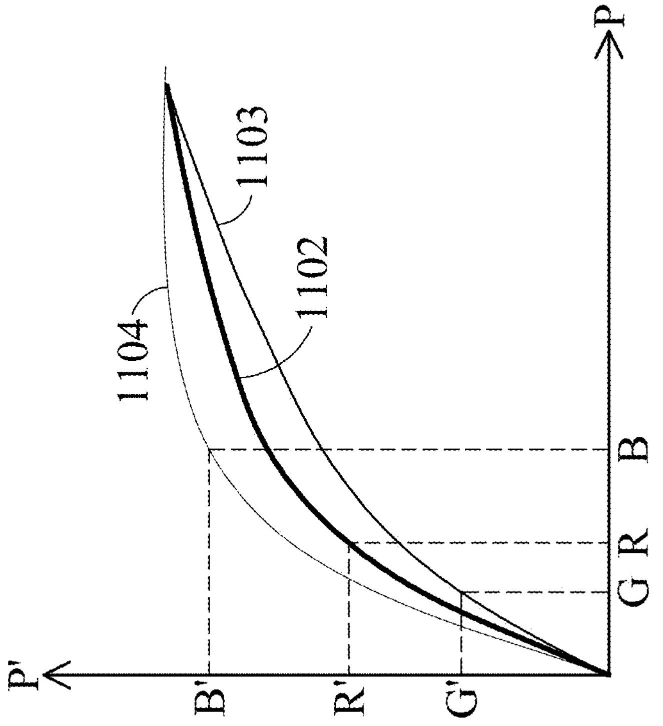
FIG. 11B plots three tone mapping curves, according to another embodiment of the present disclosure.

FIG. 11A plots the tone mapping curve 1101, according to an embodiment of the present disclosure. FIG. 11B plots the tone mapping curves 1102-1104, according to another embodiment of the present disclosure. As shown in FIG. 11A, the pixel values of R-dimension, G dimension, and B-dimension are all mapped by the tone mapping curve 1101. In contrast, the pixel values of R-dimension, G dimension, and B-dimension in FIG. 11B are mapped to the tone mapping curve 1102, the tone mapping curve 1103, and the tone mapping curve 1104, respectively.

To sum up, the embodiments of the image processing method and the image processing device can dynamically and adaptively control the maximum display luminance of the display apparatus based on the brightness of the image, enabling images (especially HDR images) to be displayed more properly on a wide variety of display apparatus.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image processing method, carried out by an image processing device, the method comprising:

analyzing brightness information of a portion of a source image;

calculating a luminance control value based on the brightness information of the portion of the source image; and adjusting a maximum display luminance of a display apparatus based on the luminance control value, wherein calculating the luminance control value based on the brightness information comprises:

calculating a first tone mapping function based on the brightness information of the portion of the source image;

calculating a brightness compensation value by using the first tone mapping function, wherein the brightness compensation value is a difference between function values of the first tone mapping function and a reference tone mapping curve; and determining the luminance control value based on the brightness compensation value.

2. The method as claimed in claim 1, further comprising:

adjusting pixel data of the portion of the source image based on the brightness information;

wherein the pixel data comprises a pixel value of each of a plurality of pixels of the portion of the source image.

3. The method as claimed in claim 2, wherein the pixel data of the portion of the source image is adjusted by using one of the following strategies:

a first strategy, using a tone mapping function to calculate the adjusted pixel value;

a second strategy, using a one-dimensional lookup table (1DLUT) to determine the adjusted pixel value; and a third strategy, using a three-dimensional lookup table (3DLUT) to determine the adjusted pixel value;

a fourth strategy, using an N×M transformation matrix to determine the adjusted pixel value, wherein the values of N and M are arbitrary.

4. The method as claimed in claim 3, wherein colors of the pixel value are mapped in an HSV domain, a YCbCr domain, a YUV domain, a ICtCp domain or in an RGB domain.

5. The method as claimed in claim 1, wherein the step of adjusting the maximum display luminance of the display apparatus based on the luminance control value comprises:

determining a first voltage based on the luminance control value; and applying the first voltage to a first electrode of a transistor in a display panel of the display apparatus;

wherein the step of adjusting pixel data of the portion of the source image based on the brightness information further comprises:

determining a second voltage based on the adjusted pixel value; and applying the second voltage to a second electrode of the transistor in the display panel of the display apparatus;

wherein a third voltage is applied to a third electrode of the transistor in the display panel of the display apparatus; and wherein the maximum display luminance of the display apparatus is dependent on the difference between the first voltage and the third voltage.

6. The method as claimed in claim 1, wherein the step of adjusting maximum display luminance of the display apparatus based on the luminance control value comprises:

generating a pulse-width modulation (PWM) signal based on the luminance control value; and transmitting the PWM signal to a backlight layer of a display panel of the display apparatus.

7. The method as claimed in claim 1, wherein the brightness information comprises one or more of the following: an average pixel value, a maximum pixel value, a medium pixel value, a distribution of pixel brightness, a cumulative distribution function of pixel brightness, a probability density function of pixel brightness, and a pixel count ratio between brightness areas.

8. The method as claimed in claim 1, further comprising:

lowering the maximum display luminance of the display apparatus regardless of the brightness information in response to the display apparatus being in a power saving mode.

9. An image processing device, comprising:

a content analyzer module, configured to analyze brightness information of a portion of a source image; and a luminance control module, configured to calculate a luminance control value based on the brightness information of the portion of the source image, and to adjust a maximum display luminance of a display apparatus based on the luminance control value, wherein the luminance control module is further configured to:

calculate a first tone mapping function based on the brightness information of the portion of the source image;

calculate a brightness compensation value by using the first tone mapping function, wherein the brightness compensation value is a difference between function values of the first tone mapping function and a reference tone mapping curve; and determine the luminance control value based on the brightness compensation value.

10. The image processing device as claimed in claim 9, further comprising:

a pixel data control module, configured to adjust pixel data of the portion of the source image based on the brightness information;

wherein the pixel data comprises a pixel value of each of a plurality of pixels of the portion of the source image.

11. The image processing device as claimed in claim 10, wherein the pixel data of the portion of the source image is adjusted by using one of the following strategies:

a first strategy, using a tone mapping function to calculate the adjusted pixel value;

a second strategy, using a one-dimensional lookup table (1DLUT) to determine the adjusted pixel value; and a third strategy, using a three-dimensional lookup table (3DLUT) to determine the adjusted pixel value;

a fourth strategy, using an N×M transformation matrix to determine the adjusted pixel value, wherein the values of N and M are arbitrary.

12. The image processing device as claimed in claim 11, wherein colors of the pixel value are mapped in an HSV domain, a YCbCr domain, a YUV domain, a ICtCp domain, or in an RGB domain.

13. The image processing device as claimed in claim 9, wherein the luminance control module is further configured to determine a first voltage based on the luminance control value, and to apply the first voltage to a first electrode of a transistor in a display panel of the display apparatus;

wherein the pixel data control module is further configured to determine a second voltage based on the adjusted pixel value, and to apply the second voltage to a second electrode of the transistor in the display panel of the display apparatus;

wherein a third voltage is applied to a third electrode of the transistor in the display panel of the display apparatus; and wherein the maximum display luminance of the display apparatus is dependent on the difference between the first voltage and the third voltage.

14. The image processing device as claimed in claim 9, wherein the luminance control module is further configured to generate a pulse-width modulation (PWM) signal based on the luminance control value, and to transmit the PWM signal to a backlight layer of a display panel of the display apparatus.

15. The image processing device as claimed in claim 9, wherein the brightness information comprises one or more of the following: an average pixel value, a maximum pixel value, a medium pixel value, a distribution of pixel brightness, a cumulative distribution function of pixel brightness, a probability density function of pixel brightness, and a pixel count ratio between brightness areas.

16. The image processing device as claimed in claim 9, wherein the luminance control module is further configured to lower the maximum display luminance of the display apparatus regardless of the brightness information in response to the display apparatus being in a power saving mode.

* * * * *